Aug. 26, 1958  J. O. ALMEN ET AL  2,849,346
METHOD OF MAKING A COMPOSITE FRICTION UNIT CLUTCH PLATE
Original Filed Nov. 17, 1953

INVENTORS
John O. Almen &
BY William L. Carnegie

Their Attorney

2,849,346

METHOD OF MAKING A COMPOSITE FRICTION UNIT CLUTCH PLATE

John O. Almen, Sierra Madre, Calif., and William L. Carnegie, Romeo, Mich., assignors to General Motors Corporation, Detroit, Mich., a corporation of Delaware Original application November 17, 1953, Serial No. 392,596, now Patent No. 2,733,797, dated February 7, 1956. Divided and this application January 31, 1955, Serial No. 487,822

6 Claims. (Cl. 154—81)

This is a division of application S. N. 392,596, now Patent Number 2,733,797, which is a continuation of application Serial Number 717,512, filed December 20, 1946, and now abandoned.

The invention relates to improvements in friction plates for clutches and brakes adapted to run in oil or other lubricant, and in particular to a composite friction plate such as could be used in a transmission drive assembly such as shown in U. S. 2,357,295 to Earl A. Thompson, issued September 5, 1944.

The composite plate as described below consists of a metal disc of either stamped stock or of sintered metal having a wear-face made up of fibrous or woven material. The metal may be steel or other suitable sheet stock. The wear-face is stiffened by the use of a plastic coating on the fibers of the thermo-setting type, applied so as to leave interstitial voids between the fibers, the mat so formed having the character of a sponge. An adhesive coating layer of such thermo-setting plastic is preferably placed on the supporting metal disc, the whole heat setting operation taking place in an oven with the composite disc under a given mechanical pressure.

One object of the invention is to form composite friction discs suitable for clutches and brakes in forms adaptable for either single or multiple disc units, the thermo-setting plastic being chosen so as to be non-sensitive to temperature changes or to oil lubricants.

In making up this plate, we find that the fibers may be of organic or mineral material such as felted cellulose paper, synthetic viscose wool, asbestos, glass wool, and other materials of like fibrous nature. These may be either felted or woven, the fundamental requirement being that when the body of the material is wetted with a thin solution of thermo-setting cement, there are space voids left in the spaces between the fibers in all dimensional directions to preserve its ability to permit inflow and outflow of oil. This procedure has been found to provide stiffness with elasticity avoiding compacting of the material which would destroy its porous nature, and thus provides long life in a clutch subject to high torques per square inch of surface and to the action of rapidly circulated lubricant.

Figure 1:
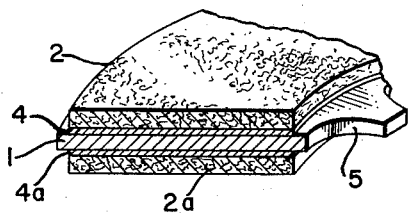
Figure 2:
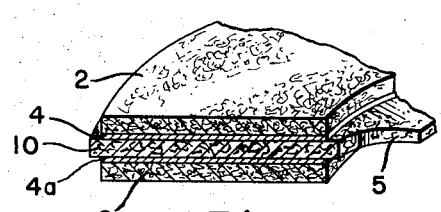

In the appended drawings:

Fig. 1 is a part section and projection view of a clutch plate having wear surfaces of felted mat material affixed to a plain support disc by a thermo-setting bonding layer. Fig. 2 is similar to Fig. 1 except that the support disc is made of sintered metal which provides greater surface anchorage than the plain disc.

Figure 3:
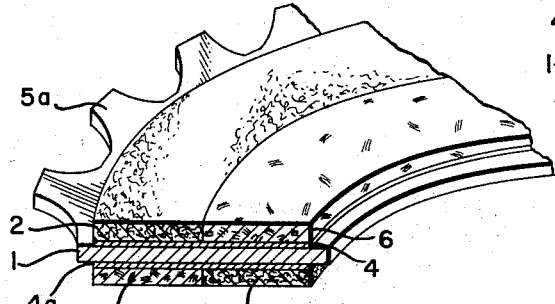
Figure 5:
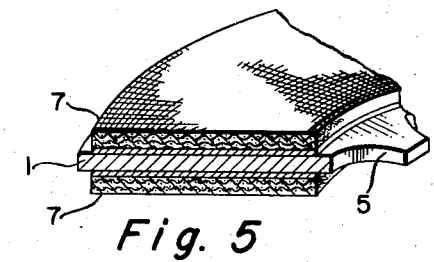
Figure 4:
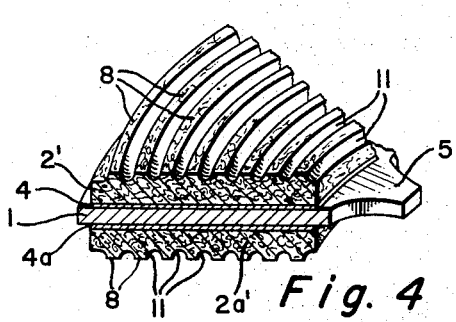
Figure 6:
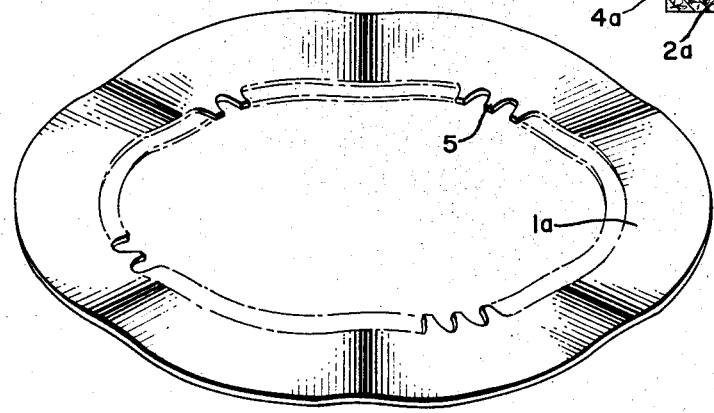

Fig. 3 is a part section of a composite clutch disc having double rings of different forms of wear facings, to provide differential friction characteristics in one plate. Fig. 4 is a view like that of Fig. 1 in which the felted mat facing is channeled for controlled oil relief. Fig. 5 shows a form of composite disc having woven mat facings. Fig. 6 is a view of a wavy disc, so formed to provide a controlled loading interval and to increase the axial elasticity of the stack of clutch discs for desired special loading and unloading characteristics. This disc may be used in the clutch disc as disclosed in our parent application Serial No. 717,512, now abandoned, and its continuation application Serial No. 392,599, now matured into U. S. Patent 2,733,797.

In a typical transmission of this type the faced clutch plates described herein are used in connection with alternate unfaced metal plates such as steel plates, not shown. The unfaced plates may be coned, waved or otherwise made resilient to axial pressure and are alternated with the faced plates. All faced plates are splined together and all unfaced plates are also splined together whereby when axial loading pressures are exerted, the clutch pack is compressed axially thereof and torque is transmitted from one set of plates to the other. Specific structural details of the unfaced plates form no part of the invention which is directed to the method of making the wear or friction face and/or the faced plates.

In our process to be given in detail below, we use a cement mixture, as an example, of the following specifications:

*Formula I.—Resin (parts by weight)*

47 parts phenol crystals
51.5 parts formaldehyde sol. 35 to 40 pct. Tec.
1.5 parts ammonium hydroxide 28 pct. sol.

Mix in flask connected to refluxing and distilling apparatus. Continue refluxing 1 hour after mix temperature reaches 200 deg. F., then distill under maximum vacuum for 45 minutes, for removal of water. Agitate mixture constantly during both operations, maintaining bath at boiling temperature of water. At peak of refluxing, resin temperature is held at 210 deg. F., dropping to 204 deg. F. at end of refluxing. In distillation, resin temperature may drop to 120 deg. F. and rise to 160 deg. F. during distilling action. Store resin at 50 deg. F., until ready to be used.

*Formula II.—Cement (parts by weight)*

115 parts resin of Formula I
150 parts propyl alcohol (for visc. 90–100 deg. M.)
50 parts china clay (selected kieselguhr)
6 parts powdered hexa-methylene-tetramine Stir-mix thoroughly to dissolve hexa., adding china clay after solution mix is clear and not lumpy. Store at 50 deg. F. until ready for use.

*Formula III.—(Procedure)*

(1) Mix equal volume of resin of Formula I with iso-propyl alcohol which will give a solution of 20 to 25 pct. solids ratio after evaporation.

(2) Impregnate felted rings in solution of step 1 for 2 to 3 minutes. Centrifugally spin off excess resin solution.

(3) Dry in oven at 200 deg. F. for 30 minutes. Test for spongy nature of ring.

(4) Apply cement of Formula II to metal disc. Wipe off excess to 0.005" thickness. Pre-dry with 5 minute infrared exposure. Bonding layer should be slightly tacky.

(5) Assemble dried impregnated rings of step 3 with cement coated discs of step 4. Press mechanically to remove air bubbles and initiate adhesion of rings to disc.

(6) Bake 20 minutes at 300 deg. F., in air circulation furnace.

(7) Clean baked article of excess cement, including droplets on faces of felted discs.

The above formulas for producing the complete clutch disc of the present invention are not to be understood as restricting the scope of the invention—but are given to make the invention wholly clear in principle.

One skilled in the art, with these instructions is able to reproduce the invention in different forms. Other resins and solvents may be utilized without departing from the teachings herein, and variations and modifications of the procedural steps given in Formula III are likewise available to the skilled worker in this field.

In Formula III, for example, step 4 may be replaced by substitution of a bonding layer ring cut from a sheet or film of plastic having the Formula II and assembled between metal disc and the felted, impregnated ring in Step 5. In this a light coat of wet cement may be given the metal disc to promote bonding, prior to mechanical pressing for initial adhesion.

Another modification concerns applying the bonding layer of the resin directly to one face of the felted and impregnated ring after which the face with the bonding layer thereon may be pressed into engagement with one of the faces of the metal disc under light mechanical pressure and may be cured by conventional procedures.

The stiffening mixtures noted above may be almost water thin, and are soaked into the formed rough discs which have been cut from sheet stock to desired shape. After this wetting, the rough discs are air dried, which process may be accelerated by the blowing of de-humidified warmed air upon them. The thinner ingredients evaporate, leaving each of the fibers encased in a sheath of the plastic, with plastic joints at the points of intersection of the fibers. When the felted piece is dry it is laid over a coating of plastic cement formed on the supporting metal plate, of the same general formulation as that originally used in wetting the felted plate, but the coating mixture contains less of the solvent thinner. This coating is first wiped with a blade at uniform pressure to remove the excess, and is then ready for affixing the felted piece or mat to the metal disc, which may be of iron, steel, bronze or other alloy.

The metal discs are chemically or otherwise cleaned, and may be coated with the heavier bodied cement prior to applying the rough wearface disc; the latter disc is then applied to the metal disc under controlled light mechanical pressure to squeeze out the air bubbles so as to form a tight bond with the metal, and the assembly is then inserted in an oven, and maintained in a spacer clamp under light mechanical pressure, for a predetermined baking period at relatively low temperature in the range of 290 to 310 deg. F. The spacer arrangement is to control the degree of mechanical pressure for avoidance of compacting. The degree of holding or fixture pressure may be only a few pounds, much less than the heavy mold pressures ordinarily used in this art which are normally from 300 to 1000 pounds per square inch, for solid mold end products.

After cooling and inspection, the composite plate is ready for use. Instead of the adhesive coating being applied in liquid form, this material may be cut in a dried film state and placed between felted disc and support plate prior to heat assembly in the final setting operation. In the figures the numerals 4 and 4a denote the bonding layer, applied either in fluid or dry from.

For discs requiring wear-faces on both sides, the second rought disc is affixed to the metal disc in the same manner as outlined above, and the assembly is then baked as a unit.

So as to provide some specific examples of the objects and advantages it is deemed useful to describe in exact detail at least one article and sequence of making it for proper instruction of those skilled in the art. In Figure 1 we show a broken-away projection view of a portion of a typical clutch plate. A metal plate 1, which may be of bronze, steel, cast-iron or other useful alloy, is made chemically or mechanically clean prior to succeeding operations combining it with the wear-surface discs 2 and 2a. The splines 5 are for the purpose of requiring the composite clutch disc to rotate with a drum as a part of a drive assembly. The spline teeth may also be formed in the outer periphery, as is shown in Fig. 3. The finished article as sectioned in Fig. 1 shows the central plate 1 with the spongy wear surfaces attached to both faces, the bonding layer 4 being emphasized. It will be understood by those skilled in the art that the plastic bonding layers 4 and 4a made up as described above, and thermoset by application of heat, has an intimate relationship with the surface crystal formation of the metal strip and with the fibrous body of the attached or cemented working face. This gives a homogeneous bond not otherwise readily obtained, and tends to prevent local loss of adhesion by the uniform nature of the whole plastic bond body of plate and fibers.

In Figure 2 we show a similar section to that of Figure 1 with the exception that instead of the metal strip plate 1, a sintered metal piece 10 is substituted. The processing of the latter in the forming of the composite particle may be somewhat different, due to the fact that it may be undesirable to trap or pocket bodies of plastic, oil or thinner inside the metal sponge of the sintered plate 10. To guard against this undesired result, the sintered plate 10 may be slightly wetted with the thermo-plastic combination given above in the Formulas I and II, and centrifugally dried, so that during the succeeding oven operation the pore system of the sintered metal plate 10 will be exposed to the atmosphere through the pore system of the felted material in the body 2, cemented thereon. In practice, it is desirable to drive off the excess thinners by evaporation with warmed, dried air, over a longer time than normally required for the drying of the felted paper bodies 2 and 2a alone. The operator should have no particular difficulty in using the sintered plate, if such be desirable.

Experience has indicated a need for utilizing materials for the wear-faces of these discs having different degrees of compressibility and different coefficients of friction. In the plate assembly shown in Figure 3 a two-part wearface is shown. The metal strip 1 is toothed externally at 5a for the reason given above, and has on its top face an affixed inner circular ring 6 made of cork, and at the outer periphery of which is a spongy ring of felted fibers 2 similar to that shown in Figures 1 and 2. The cork piece 6 may be of cemented cork fragments, or cut from a continuous cork layer sheet as peeled from the bark of the cork oak tree. In applying the cork ring 6 to the plate 1 a heavy-bodied cement having a low thinner or solvent ingredient is best usable. Since the cork piece may have a somewhat higher degree of compressibility, as used in a clutch, it will be compressed during the preliminary loading of the clutch in which it operates, and its coefficient of friction will provide initial clutch torque capacity, followed by the application of the torque in greater proportion to the external felted ring 2. For this purpose the thickness dimension of the cork may be slightly greater than the finished dimension of the felt disc. The lower face of the plate of Fig. 3 may be arranged with the cork face 6a on the outer periphery and the felted piece 2a in the inner position.

In the above instructions, where reference is made to the spongy felted material we are referring likewise to a material which is essentially a form of bonded paper, or cardboard. It is believed worthy of comment that clutches handling a very high torque capacity per square inch, equivalent to that of metal face clutches, and with less loading requirement, have proven experimentally satisfactory, over many miles of operation such as is experienced in a motor vehicle. These findings are, of course, in the use of clutch plates made according to the instructions herein in clutch assemblies which are deliberately designed to maintain a moving stream of cooling lubricant over the faces of the clutch discs during the periods of engagement and disengagement, at which times, otherwise, serious abrasion might occur.

In Figure 4 we show a composite plate 2' on the upper face, in which the felted material is channeled into lands 8, the depth of which is approximately equal to the width of the grooves 11 between the lands, the net wear area of the lands 8 being taken for the required torque capacity of the plate. The Figure 4 showing is similar in all respects to that of Fig. 1 except that channeled plates 2' and 2a' are shown. It will be observed that upon initial application of plate loading, the fibers supported in their plastic sheaths will deflect under loading pressure, and there will be a small degree of lateral bulging of the felted material in the grooves 11, which will have the effect of diminishing the amount of oil which may be trapped therein, with increase of clutch loading. The grooves 11 may be entirely circumferential, or may be spiral, as desired for the proper ejection of excess oil from the working area. The bases of the grooves are preferably curved as shown.

Figure 5 is to show the use of woven material in place of the felted material of the other figures, the woven discs 7 being pre-treated similar to the processing given the felted discs, having likewise a prior wetting of the thin plastic solution, followed by drying, application of the denser bonding layer plastic to the base plate 1, and when assembled ready for the oven, the piece has the appearance of the Figure 5 section. It should be understood that the degree of mechanical pressure applied during the oven process may under special circumstances, be very slight or may rise as high as 1000 pounds per square inch for heavy machinery plates, depending upon the ultimate size, design and power requirements of the unit in which the disc is to be installed, since under heavy compressions and with a strong cement the bonding action will be accompanied by a squeezing of the fibers which reduces the volumetric space of the voids in which oil may flow. An oil saturated plate for light work other than for so-called heavy machinery may be formed with as little as 2 to 5 pounds per square inch, with the plastic solutions noted above. The woven disc 7 in practice, provides a reticulated wear-face pattern.

Figure 6 shows a special form of wavy disc 1a, so formed that upon initial loading, the torque carried by the stack of plates is first delivered by the small peak areas which progress in size as the discs are flattened by loading pressure.

The wavy discs 1a are fitted with wear facings in the same manner as set forth above for the flat discs. In practice, it is found that the slight axial flexing of a plate so made does not cause loosening of the bonded layers 4, 4a, because the felted or composite material flexes uniformly with the steel disc to which it is attached.

As noted above, the plain steel clutch plates, in their unstressed condition may be coned, and the plates 1a being wavy as shown in Fig. 6. It is therefore obvious that when the loading force is applied, the coned plates are flattened and the composite plates 1a are also flattened, the resilient characteristics of both serving to provide a clutch release spring action.

The Fig. 3 form of composite plate shows the external sponge ring face 2 and the internal cork ring face 6 on the upper side, and the external cork ring face 6a and the internal sponge ring face 2a on the lower side.

There are two possible methods of interleaving the sets of plates—one in which under applied load the inner cork face 6 of one side and the outer cork face 6 of the opposite side will make initial contact with the inner and outer portions of the respective cone faces of the steel discs—so that initial torque is sustained only by the cork faces, followed by final full contact of both sets of faces as the plates are flattened. The alternate arrangement is obviously that of phasing the coned discs with respect to the inner and outer ring faces of the Fig. 3 form such that the initial torque is sustained only by the felted sponge faces 2 and 2a, followed by the full face contact at maximum loading compression. The designer may choose either of these alternatives, in accordance with the desired build-up of torque to be transmitted.

A word as to the modern theory of wet clutches is believed instructive at this point. For many years dry clutch plates faced with organic materials, or with combinations of organic with mineral fibers, and molded, have been in use. Experience with this class of wear-face material is that an inevitable charring of the organic material takes place even in an oil bath, with eventual deposition of gums from the body of the lubricant. This is true because of the momentary high temperatures existing on the wear-faces, during the loading cycle. Thermocouple tests show that the surface fibers of such clutches must withstand momentary temperatures far beyond those which organic fibers can of themselves resist without changing their chemical nature. To circumvent this phenomenon, we have devised the special combinations described herein in which useful coefficients of friction and of torque capacity per square inch are achieved, at the same time yielding maximum exposure of the contact areas of the fibers to the stream of cooling lubricant. There appears to be a direct relationship between the net area of the individual fiber or particle in the clutch surface with respect to the interstitial space and the cooling effect resulting from a given velocity of lubricant moving across the clutch face. In the present invention we have not only provided for a small fiber or particle in the working surface, but also provide adjacent pores and tiny channels through which the lubricant may flush. In the case of Figure 5 larger channels are superimposed, for the benefit of the designer who wishes to control the lubricant flow and retention with a degree of exactness.

Rather extraordinary results are obtained with clutch plates made in accordance with the instructions herein, and these results include the use of the discs as friction brakes, wherein one of the disc-holding members is non-rotatable. A further advantage appears in the relatively small size of a clutch assembly for a given torque handling capacity, in the present invention, it being found that the overall dimension allowance for a given clutch problem may be scaled down as much as 30% below those of existing commercially used dry clutches. This saving is achieved on a dimensional basis, but a further saving appears in the provision herein of less expensive, and more easily controlled compressible materials. From the point of view of an overall economy wherein expensive metals, such as special bronzes and similar alloys are replaced by cheaper organic substances, a general benefit is conferred upon the public, in commercial use of the invention.

There are a number of plastic mixtures which are adaptable to the purposes described herein, and it is believed only necessary to show the above listed operable materials of this type, by way of example, since a designer provided these teachings would require a latitude of selection of plastics which would enable him to meet the design requirement for operating temperatures, and therefore in the above example we have provided known materials which yield proper operation in a clutch of current, standard automobile or automotive specifications.

It will therefore be seen that the composite friction unit clutch plate which we have shown and described, may be made up of various fibrous and plastic materials, and in various shapes and forms, and we therefore desire that a broad construction be placed upon our invention as a composite friction torque absorbing plate in ring form, made of fibrous substances forming the wear-faces, the fibers thereof being individually supported by thermo-setting plastic sheaths and bonded to a metal backing plate by a thermo-setting bonding layer; the plate also being formable with plural wear-face rings of different fibrous structure as described above. It is therefore obvious that any changes in detail, arrangement and selection of parts may be made as above shown and described, and we therefore do not desire to be restricted in the scope of our invention except as properly limited by the appended patented claims.

We claim as our invention:

1. In the power transmission arts the process of forming a friction disc for absorbing and transmitting torque to be operated in a circulating lubricant bath, consisting of the steps of cleaning a metal disc, of wetting a fibrous wear-face disc with a thermo-setting plastic solution of phenol-formaldehyde type having a relatively high solvent content, of drying said wear-face disc such that the thermo-setting plastic joins the fibers thereof at their points of adjacent contact but forming a thin continuous coating on said fibers while leaving interstitial voids between said fibers, said drying action including spinning of the disc while wet to centrifuge away an excess of the said solution; the step of forming an adhesive layer upon one side of said dried wear-face disc made of said thermo-setting plastic solution but having a lower solvent content, the step of placing said wear-face disc with said layer upon said metal disc and compressing same under controlled mechanical pressure of magnitudes less than 300 pounds per square inch, and the final step of oven baking the said composite disc thus formed, such that the adhesive layer and the wear-face disc form a continuity of material having a firm bond with the metal disc.

2. The process of making a composite clutch disc formed upon a metal disc and to be operated in a lubricant bath, consisting of the steps of forming a fibrous mat having interstitial voids therein for affixing to said disc, the said mat being dipped in a relatively thin stiffening mixture of thermo-setting cement for sheathing coating of the fibers of said mat while leaving interstitial oil-flow spaces among said fibers, of drying the said dipped mat by spinning the said mat for centrifugal removal of excess stiffening mixture, of coating the said disc with a relatively heavier layer of said thermo-setting cement, of pressing the said dipped mat with said layer in place adjacent to the coated surface of said disc, and of baking the assembly of said disc; said layer and said mat in a holding fixture under light mechanical pressure applied to said mat for primary adhesion to said disc, said pressure being insufficient to cause compacting of the sheathed fibers of the said mat, so as to preserve the oil-flow sponge character thereof.

3. In the power transmission arts the process of forming a clutch plate upon a metal base in which a friction disc is mounted for absorbing and transmitting torque to be operated in a circulating lubricant bath by a constantly circulating oil body, the process consisting of the steps of treating a wear-face disc composed of fibers with a thermo-setting plastic solution having a relatively high solvent content, said solution containing a phenol-formaldehyde resin, of drying said wear-face disc such that the thermo-setting plastic joins the fibers thereof at their points of adjacent contact but forming a thin continuous coating on said fibers while leaving interstitial oil-flow voids connecting between said fibers, said drying step including centrifuging away of excess plastic solution, the step forming an adhesive layer on one side of said dried wear-face disc made of a thermo-setting plastic solution of lower solvent content than the first mentioned, the step of placing said wear-face disc with said layer adjacent said metal disc under light controlled mechanical pressure to provide initial adhesion, and the final step of oven baking the said composite disc thus formed, such that the thermo-setting plastic adhesive layer and the wear-face disc form a continuity of material having a firm bond with the metal disc.

4. In the power transmission arts the process of forming a clutch plate on a metal base disc including the formation of a friction disc for absorbing and transmitting torque to be operated in a circulating lubricant bath, and lubricated by the oil body of said bath, the process consisting of the steps of treating fibrous, wear-face disc with a thermo-setting plastic solution having a relatively high solvent content, said solution being of the phenol-formaldehyde type, of drying said wear-face disc such that the thermo-setting plastic joins the fibers thereof at their points of adjacent contact so as to form a thin continuous coating on said fibers while leaving interstitial oil-flow voids connecting between said fibers, said drying step including centrifuging of said wetted disc to remove excess plastic solution, the step of forming an adhesive layer upon one side of said dried wear-face disc made of said same thermo-setting plastic but of lower solvent content than the solution first mentioned, the step of placing said wear-face disc with said layer upon said metal disc under light controlled mechanical pressure for insuring primary adhesion and the final step of oven baking the said composite disc thus formed, such that the thermo-setting adhesive layer and the wear-face disc form a continuity of material having a firm bond with the metal disc.

5. In the art of making a bonded structure in annular form for use as a clutch plate having a metal disc base, the process of forming a body of organic fibers into a ring-shaped mat, of treating said mat with a fluid embodying a thermo-setting plastic resin of the phenol-formaldehyde type so as to coat the fibers thereof with sheathing of the said resin while leaving interstitial voids between and among the said fibers, said coating step including spinning of said treated mat for centrifugal removal of excess sheathing fluid, of applying a bonding layer of said same thermo-setting resin to one outer face of said mat, of pressing said bonding layer upon a mating face of said metal disc to form an assembly, the step of placing said assembly under light mechanical pressure in a heating oven, and of also subjecting the said assembly to a degree of heat over a predetermined time period to set the resin coating of said fiber sheathing and to set the said bonding layer.

6. In the process of making a composite clutch plate comprising a wear face bonded to a metal disc and adapted for use in a lubricant bath, the steps comprising; forming a fibrous mat having interstitial voids therein for subsequent attachment to said disc, dipping said mat in a fluid mixture including a thermosetting resin as a base for sheath coating the fibers of said mat, drying the dipped mat by spinning the mat for centrifugally removing excess coating material and for forming interstitial lubricant flow ducts between the fibers, adhering the metal disc to the dried mat with a layer of thermosetting resin cement, and then baking the assembly of the disc, curing and mat under mechanical pressure sufficient to cause a bonding of the mat to the disc while maintaining the interstitial lubricant flow ducts between the fibers of the mat.

References Cited in the file of this patent

UNITED STATES PATENTS

| | | |
|---|---|---|
| 1,609,937 | Forrest | Dec. 7, 1926 |
| 1,759,326 | Scholler | May 20, 1930 |
| 2,052,808 | Spokes | Sept. 1, 1936 |
| 2,070,335 | Hiers | Feb. 9, 1937 |
| 2,087,441 | Metcalf et al. | July 20, 1937 |
| 2,172,251 | Copeman | Sept. 5, 1939 |
| 2,213,883 | Lurie | Sept. 3, 1940 |
| 2,345,844 | Weiss | Apr. 4, 1944 |
| 2,415,097 | Hasimoto | Feb. 4, 1947 |
| 2,419,756 | Arnold | Apr. 29, 1947 |
| 2,546,056 | Batchelor | Mar. 20, 1951 |
| 2,550,465 | Gorski | Apr. 24, 1951 |
| 2,553,215 | Schultz | May 15, 1951 |
| 2,581,069 | Bertolet | Jan. 1, 1952 |
| 2,592,521 | Thompson | Apr. 8, 1952 |
| 2,610,138 | Heritage | Sept. 9, 1952 |
| 2,610,893 | Collins et al. | Sept. 16, 1952 |
| 2,704,730 | Glatt | Mar. 22, 1955 |